United States Patent [19]

Ford

[11] 4,219,107

[45] Aug. 26, 1980

[54] SPEED CONTROL DEVICE FOR A HEAVY DUTY SHAFT

[76] Inventor: Robert A. Frosch, Administrator of the National Aeronautics and Space Administration, with respect to an invention of Allen G. Ford, Pasadena, Calif.

[21] Appl. No.: 860,404

[22] Filed: Dec. 13, 1977

[51] Int. Cl.² .................................................. B60T 7/12

[52] U.S. Cl. ...................................... 188/134; 188/180; 188/184; 244/173

[58] Field of Search ............... 188/134, 180, 184, 185; 187/38, 39; 192/7; 244/168, 173

[56] References Cited

U.S. PATENT DOCUMENTS

| | | | |
|---|---|---|---|
| 654,620 | 7/1900 | Garver | 188/184 |
| 1,459,394 | 6/1923 | Gent | 188/185 |
| 1,776,372 | 9/1935 | Ranger | 188/180 |
| 2,003,552 | 6/1935 | Ranger et al. | 188/180 |
| 2,234,181 | 3/1941 | Lang | 188/180 |
| 2,394,361 | 2/1946 | Bruderlin | 188/180 |
| 3,144,102 | 8/1964 | Nomann | 188/134 |
| 3,491,858 | 1/1970 | Pomagalski et al. | 188/134 |
| 3,898,817 | 8/1975 | Capewell | 188/134 |
| 4,046,235 | 9/1977 | Shutt | 188/134 |

*Primary Examiner*—Edward R. Kazenske
*Attorney, Agent, or Firm*—Monte F. Mott; John R. Manning; Wilfred Grifka

[57] ABSTRACT

A speed control device characterized by a reference speed shaft spatially related to a heavy duty shaft, a drive train for driving the reference speed shaft at a constant angular velocity, a drive train for driving the heavy duty shaft at a variable angular velocity and a speed control assembly for continuously comparing the angular velocity of the heavy duty shaft with the angular velocity of the reference speed shaft, and a brake assembly connected to the heavy duty shaft adapted to respond to errors in the angular velocity of the heavy duty shaft for reducing the angular velocity of the heavy duty shaft to that of the reference speed shaft.

4 Claims, 2 Drawing Figures

11
50
52
32
80
40
74
54
76
72
78
11
28
27
44
26
34
66
30
64
36
42
38
62
14
16
24
VARIABLE SPEED UNIT
18
74
80
20
22
12
LOAD
13
11

SPEED CONTROL DEVICE FOR A HEAVY DUTY SHAFT

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention:

The invention generally relates to a mechanism for controlling the speed of a heavy duty output shaft, hereinafter referred to simply as a heavy duty shaft. More precisely, the invention relates to a speed control device particularly suited for use in mechanically limiting the speed of a heavy duty shaft to the speed of a small shaft, hereinafter referred to as a reference speed shaft, driven at a precisely controlled reference speed.

2. Description of the Prior Art:

It is contemplated that for certain future space missions extensive use will be made of solar sails in propelling spacecraft through celestial space environments. As a consequence, it is further contemplated that because of an increased use of solar sails reliance upon rocket engines and the like for propulsion purposes greatly will be reduced.

One of the various types of systems currently proposed for use includes a plurality of deployable blades adapted to assume an extended configuration in response to angular momentum imparted thereto in response to angular displacement of a common supporting element. Each of the blades, when extended, is approximately eight meters wide and 6,250 meters long. Therefore, it is further proposed that the blades be furled about a rotatable element for facilitating launch and subsequently unfurled into an extended configuration. Consequently, large torques can be expected to be encountered as the blades are unfurled in response to centrifugal forces acting thereon. Consequently, the speed at which the supporting element is driven in achieving an unfurling of the blades must be precisely controlled in order to avoid an introduction of unbalancing radial forces resulting from uneven mass distribution to the blades.

The prior art, of course, is replete with brakes and the like which, in operation, serve to control the speed or angular velocities of driven elements and shafts of various sizes and configurations. For example note U.S. Pat. No. 2,234,181 to Walter T. Lang. However, the speed control devices heretofore employed in controlling the angular velocity of heavy duty shafts generally lack the required precision to be found acceptable in environments wherein weight, bulk and power limitations are of a primary concern, such as in those instances in which the devices are to be employed in a celestial space environment.

It is therefore the general purpose of the instant invention to provide a novel speed control device for a heavy duty shaft characterized by a reference speed shaft coupled in driven relation with a small precisely controlled stepper motor adapted to impart thereto an angular velocity to which the angular velocity of the heavy duty shaft is continuously compared mechanically and a brake for controlling the angular velocity of the heavy duty shaft for limiting its speed to that of the reference speed shaft.

OBJECTS AND SUMMARY OF THE INVENTION

It is, therefore, an object of the instant invention to provide an improved speed control device for controlling the speed of a heavy duty shaft.

It is another object to provide an improved speed control device particularly suited for use in stabilizing the rate of rotation for a heavy duty shaft.

It is another object to provide a simple and economic speed control device wherein the speed of a driven heavy duty shaft is mechanically compared and continuously limited to that of a reference speed shaft driven by a constant angular rate of rotation.

It is another object to provide an improved speed control device for stabilizing the rate of rotation for a heavy duty shaft adapted to be employed in deploying solar sails and the like from a craft operating in a celestial space environment.

Another object is to provide a speed control device particularly useful in connection with a simultaneous deployment of a plurality of large panels from a spacecraft, but not necessarily restricted in use thereto since the speed control device has utility in terrestrial environments where the angular velocity of a heavy duty shaft must be precisely controlled.

These and other objects and advantages are achieved through a use of a reference speed shaft driven at a constant speed by a stepper motor or the like, a heavy duty shaft driven at a variable rate, means for mechanically comparing the rates of the shafts, and a brake mechanism coupled with the heavy duty output shaft controlled by the reference speed shaft for stabilizing the angular velocity of the heavy duty shaft at a rate dictated by the stepper motor will become more readily apparent by reference to the following description and claims in light of the accompanying drawings.

DESCRIPTION OF THE PREFERRED EMBODIMENT

Figures 1, 2:
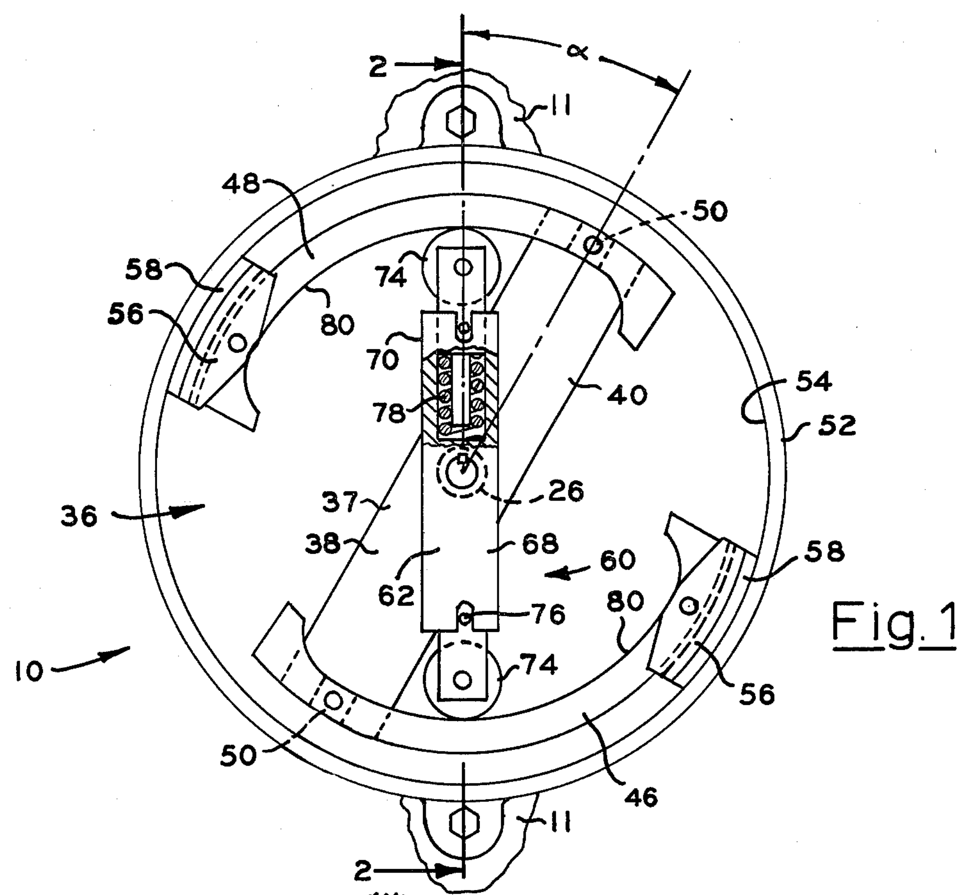
FIG. 1 is an end elevational view of a speed control device which embodies the principles of the instant invention.
FIG. 2 is a cross sectional view, taken generally along line 2—2 of FIG. 1, schematically illustrating the device in an operational configuration.

Referring now to the drawings wherein like reference characters designate like or corresponding parts throughout the several views, there is shown in FIG. 1 a speed control device, generally designated 10, embodying the principles of the instant invention.

It is to be understood that the speed controlled device 10 is supported within a suitable housing 11 which forms no specific part of the instant invention. However for the sake of clarity the device 10 is illustrated as being mounted in a housing or the like, generally designated 11, and having an output or heavy duty shaft 12 connected in driving relation with a load 13.

As a practical matter, the heavy duty shaft 12 is connected to a variable speed unit 14 adapted to drive the shaft 12 at an angular rate which, in operation, may vary in response to change in its loading. On the other hand, the load 13 comprises a load of the type requiring that a precise angular velocity be imparted the drive shaft 12. To this end the speed control device 10 is employed for stabilizing the angular velocity of the shaft 12.

The heavy duty shaft 12 is connected in driving relation with the load 13, as well as in driven relation with the variable speed drive unit 14, employing any suitable power train, not shown. It will, therefore, be appreciated that the drive unit 14, where so desired, is provided with a suitable overrunning clutch, not shown, whereby the angular velocity of the shaft 12 may be varied as the load applied thereto is varied.

In practice, a gear train 16 is interposed between the unit 14 and the shaft 12 and includes a bull gear 18 meshed with a spur gear 20 mounted on the shaft 12 and coupled thereto through the use of a key 22 seated in a suitably formed keyway, not designated.

The heavy duty shaft 12 also is connected through a spur gear 24 with an error speed indicator shaft 26. The spur gear 24 is so mounted on the shaft 12 in coaxial relation with the spur gear 20 that as a practical matter the key 22 preferably is employed for commonly connecting both the spur gears 20 and 24 to the shaft 12 simultaneously.

The spur gear 24 is connected to the error speed indicator shaft 26 through a spur gear 28 rigidly mounted on the shaft 26 and connected thereto through the use of a key 22, not shown, also seated in a suitably formed keyway, not designated.

It is to be understood that the gears 24 and 28 are intermeshed at the peripheries. Hence, rotary motion imparted to the spur gear 24, in response to rotary motion imparted the heavy duty shaft 12, serves to impart angular displacement to the error speed indicator shaft 26. Moreover, it is important to appreciate that the angular velocity imparted to the error speed indicator shaft is directly proportional to the angular velocity of the heavy duty shaft 12. Thus the diameters of the gears 24 and 28 serve to establish a fixed gear ratio so that the relationship of the angular velocities of the shafts 12 and 26 at all times remains substantially constant.

For example, where the heavy duty shaft 12 is connected with a plurality of blades for a solar sail, during an unfurling of the blades, shaft 12 may be driven at a variable speed of approximately one r.p.m., while the error speed indicator shaft is responsively driven at a variable speed of approximately fifty r.p.m. Consequently, the gear ratio for the gears 24 and 28 is approximately fifty to one. Of course, as can readily be appreciated, this ratio is varied as desired.

Extended axially through the error speed indicator shaft 26 there is a reference speed shaft 30. This shaft 30 is connected with a suitable constant speed drive, such as a stepper motor 32, the speed of which can be precisely controlled. Such a motor is commercially available and may be of a type adapted to provide an output of 2000 r.p.m. The motor 32, in turn, is connected with the shaft 30 through a suitable gear box 34 which serves to gear-down the output of the motor 32. For example, where the heavy duty shaft 12 is one r.p.m., the gear box 34 imparts an angular velocity of fifty r.p.m. to the shaft 30 even though the output of the motor 32 is 2000 r.p.m. Hence, it should be apparent that the reference speed indicator shaft 30 is maintained at a constant angular velocity so that its speed can be considered a constant and thus a reference speed.

Since because of unbalancing of loads applied to the heavy duty shaft 12 its angular velocity varies from a constant. Thus the angular velocity of the error speed indicator shaft 26 is caused to vary from a constant. Hence the angular velocity of the shaft 26 is caused to vary from that of the reference speed shaft 30. Such a variation in the angular velocity of the shaft 26 comprises an indication of angular velocity error for the heavy duty shaft 12.

The magnitude of the angular velocity error for the heavy duty shaft 12 is represented by the rate of change of the lead or lag of the shaft 26 with respect to the reference speed shaft 30. This lead or lag establishes an angle of mutual angular displacement for the shafts 26 and 30 which is hereinafter referred to as a control angle and is designated alpha, FIG. 1.

Of course, in order to stabilize the angular velocity of the heavy duty shaft 12 it is necessary that the rotation of the shaft 12 be retarded as the control angle alpha develops. Such retardation of the shaft 12 is achieved through a simple brake assembly, generally designated 36, FIG. 1, which applies an increasing load to the shaft 12 in response to increasing changes as they occur in the control angle. The increasing load applied by the brake 36 acts in opposition to forces applied to the shaft 12 in directions for increasing its angular velocity. Similarly the brake 36 applies a diminishing load as the shaft 12 slows to the speed of the shaft 30.

The brake assembly 36 includes a linear member 37 comprising a pair of axially aligned arms 38 and 40 commonly connected to the shaft 26. As a practical matter, a bore 42 is extended through the midportion of the linear member 37 and receives therein the end portion of the error speed indicator shaft 26. The shaft 26 is received in a manner such that arms 38 and 40 are commonly supported by the shaft 26. In practice arms 38 and 40 are rigidly connected with the error speed indicator shaft 26 through the use of a key 44 seated in a suitable keyway, not designated. It is, therefore, to be understood that the arms 38 and 40 simultaneously rotate about the axis of the shaft 26 in response as rotary motion is imparted to the shaft.

To the extended end portion of each of the arms 38 and 40 there is connected a foot, designated 46 and 48 respectively. Each of the feet 46 and 48 is pivotally supported at one end for free oscillation about an axis transversely related to one end of one of the arms 38 and 40. Use is made of a suitable linch pin 50, of known design, for effecting a coupling of one end of each of the feet 46 and 48 to the arms 38 and 40. Thus the feet are coupled to the shaft 26 via the linear member 37.

Disposed in circumscribing relation with the axis of the shafts 26 and 30, as well as the feet 46 and 48, there is an annular brake drum 52. This drum includes an arcuate surface 54 concentrically related with the axis of the shaft 26 and 30 so that as rotary motion is imparted to the shaft 26, the feet 46 and 48 are caused to progress along a circular path in close proximity with the arcuate surface 54 of the brake drum 52.

A brake shoe 56 is pivotally connected to one end of each of the feet 46 and 48, opposite that at which a linch pin 50 connects the foot to one of the arms 38 and 40. While the brake shoes 56 are of a suitable design, as shown, each of the brake shoes 56 is lined with a brake pad 58 disposed in contiguous relation with the surface 54. Consequently, as the error speed indicator shaft 26 is driven in rotation, the brake pads 58 are thus caused to slide along the adjacent arcuate surface 54 of the brake drum 52. However, the friction developed between the contiguous surfaces of the pads 58 and the surface 54 is largely inconsequential and produces little retardation for the heavy duty shaft 12 so long as the shafts 26 and 30 are driven at a common angular velocity and the magnitude of the control angle alpha is substantially zero degrees.

Therefore, in order to provide for an actuation of the brake assembly 36 a pressure applicator assembly, generally designated 60, is provided. The pressure applicator assembly 60 also includes a rigid linear member 62 having a bore 64 formed through the midportion thereof. This bore serves to receive therein an extended end portion of the reference speed shaft 30. In practice, a suitable key and keyway coupling 66 is provided for uniting the rigid member 62 with the shaft 30 in a manner similar to that in which the key 44 is employed for connecting the member 37 with the shaft 26.

As a matter of convenience it may be assumed that the axes of the rigid members 37 and 62 serve to define the control angle alpha.

The opposite end portions of the member 62, designated 68 and 70, serve as pressure applicator arms arranged in diametrically opposed axial alignment. Each of the end portions 68 and 70 is of a tubular configuration and serves to receive therein a pressure applicator subassembly 72. These subassemblies each include a roller 74, mounted in a bracket 76 projected axially from the end portion of the member 62. Each of the rollers 74 is supported against retraction by a compression spring 78 disposed in an abutting engagement with the bracket 76. Consequently, each pressure applicator subassembly 72 is oriented with the axis thereof being radially extended from the reference speed shaft 30 and is continuously urged outwardly in response to the applied forces of the compression spring 78.

As best shown in FIG. 2, each of the feet 46 and 48 includes a platen 80 comprising an arcuate surface defined along the inner surface of the feet 46 and 48 in concentric relation with the axis of the shafts 26 and 30. Each of the rollers 74 is, in turn, seated on a platen 80. Consequently, the rollers 74 are supported against outward displacement, relative to the shafts 26 and 30 by the platen 80. Hence the forces applied to the roller 74 by the compression spring 78 are opposed by the pivotally supported feet 46 and 48.

Moreover, it should now be apparent that when the control angle alpha is zero degrees the spring loaded rollers 74 are disposed in substantially radial alignment with the linch pins 50. However, in the event the angular velocity of the heavy duty shaft 12 is increased, for thus increasing the magnitude of the control angle alpha, the rollers 74 are thus advanced along the platens 80 toward the brake shoes 56 and away from the axis of the linch pins 50. Such advancement of the rollers along the platen 80 serve to force the brake pads 58 of the brake shoes 56 against the arcuate surface 54 of the brake drum 52 with an increasing force. Increase in the force with which the pads 58 engage the arcuate surface 54 of course increases friction between the contiguous surfaces of the pads and the brake drum. Thus a resulting restraint is applied to the rotating shaft 26, and ultimately to the rotating shaft 12, via the meshed gears 24 and 28. Of course, once the angular velocity of the heavy duty shaft 12 is reduced so that the magnitude of the control angle alpha returns to zero degrees, the rollers 74 again assume an initial position in radial alignment with the linch pins 50.

OPERATION

It is believed that in view of the foregoing description, the operation of the device will readily be understood, however, in the interest of completeness it will be briefly reviewed at this point.

With the speed control device 10 assembled in the manner hereinbefore described and connected with the heavy duty shaft 12, the device is ready for operation. Assuming, for purposes of explanation, that the heavy duty shaft 12 is connected with a load 13, comprising a plurality of furled blades forming sails for a spacecraft, rotary motion imparted to the heavy duty shaft 12 by the variable speed unit 14 causes the panels to extend under the influence of centrifugal forces applied thereto. It is necessary that the speed of the shaft 12 be precisely stabilized in order to avoid an introduction of unbalancing forces resulting in uneven mass distribution of the blades.

In order to assure the stabilization of the speed of the shaft 12 the stepper motor 32 is energized for driving the reference speed shaft 30, through the gear box 34, at a constant angular velocity. Preferably, the shaft 30 is driven at a ratio of fifty-to-one with respect to a desired angular velocity of the shaft 12. Moreover, the angular velocity of the shaft 12 is proportional to angular velocity of the error speed indicator shaft 26 because of the meshing of the gears 24 and 28. Hence, the shaft 26 is driven at an angular velocity which varies in a direct proportional relationship with the angular velocity of the shaft 12. Consequently, when the shaft 12 is driven at a proper angular velocity of, say, one r.p.m., the shaft 26 and the shaft 30 are driven simultaneously at an angular velocity of fifty r.p.m. In such instances the spring loaded rollers 74 remain seated above the pivotal axes of the linch pins 50.

However, as the load 13 decreases, as a consequence of the momentum of the blades, or the like, the angular velocity of the shaft 12 is caused to increase with an attending increase in the speed of the error speed indicator shaft 26. Thus the shaft 26 is caused to accelerate with respect to the reference speed shaft 30 for causing the arms 38 and 40 to advance relative to the member 37. As the arms thus advance a control angle alpha having an increasing magnitude is established. The magnitude of this angle is dictated by the magnitude of the error occuring in the angular velocity of the heavy duty shaft 12.

Of course, as the rigid member 37 is angularly advanced, with respect to the rigid member 62, the rollers 74 are caused to advance away from the axes of the linch pins 50 and toward the brake shoes 56. Due to the forces applied to the platens 80 of the feet 46 and 48, by the springs 78 acting on the rollers 74, an increase in the forces with which the brake shoes 56 act on the arcuate surface 54 of the brake drum 52 is increased. Thus the friction developed between the adjacent surfaces of the pad 58 and the arcuate surface 54 is increased. The thus increased friction acts in opposition to the rotation of the error speed indicator shaft 30 and, therefore, acts in opposition to the heavy duty shaft 12 for thus retarding its rotation. Of course, as the shaft 12 is caused to decelerate, because of the effects of the brake assembly 36, control angle alpha is eliminated and the rollers 74 return to their initial positions over the axes of the linch pins 50 and the speed of the shaft 12 stabilizes.

In view of the foregoing, it is believed to be apparent that the speed control device which embodies the principles of the instant invention provides a practical solution to the perplexing problems heretofore encountered when attempting to control precisely the speed of a heavy duty shaft.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. A speed control device for a load sustaining heavy duty shaft comprising:

A. a reference speed shaft spatially related to a heavy duty shaft;

B. a variable speed drive motor coupled to said heavy duty shaft for imparting a first angular velocity to the heavy duty shaft independent of any sustained load thereon and a constant speed drive motor coupled to said reference speed shaft for imparting a reference angular velocity to the reference speed shaft; and C. speed control means connected to the heavy duty shaft for maintaining a fixed relationship between the angular velocities imparted to the shafts, including:

(1) an error indicator shaft for indicating the instantaneous angular velocity of said heavy duty shaft comprising a tubular shaft concentrically related to said reference speed shaft;

(2) means including a gear train interconnecting said error indicator shaft and said heavy duty shaft for maintaining the angular velocity of the error indicator shaft and the angular velocity of the heavy duty shaft in a fixed proportional relationship; and (3) brake means connected with the error indicator shaft responsive to increases in the angular velocities of the heavy duty shaft, relative to the angular velocity of the reference speed shaft, for restraining the error indicator shaft against angular displacement for thereby reducing the angular velocity of the heavy duty shaft.

2. The device of claim 1 wherein said brake means includes:

A. an annular brake drum concentrically related to said error indicator shaft;

B. an arm rigidly affixed to said error indicator shaft and radially extended therefrom; and C. a brake foot pivotally connected to said arm having a frictional brake pad affixed thereto and supported thereby in an engaged relation with the surface of said brake drum.

3. The device of claim 1 wherein said brake means includes:

A. an annular brake drum having an arcuate surface concentrically related to said error indicator shaft;

B. a pair of arms radially extended from said speed indicator shaft;

C. a pair of friction feet, each having a surface defining a platen of an arcuate configuration facing said error indicator shaft;

D. means pivotally connecting each foot of said pair to an extended end of one arm of said pair of arms, whereby the feet are supported by the arms for advancement along a circular path concentrically related to said indicator shaft;

E. a brake shoe affixed to each foot, near the free end thereof for frictionally engaging the surface of the brake drum; and F. a pressure applicator disposed in engaged relation with said platen for varying the pressure at which the shoe engages the surface of the brake drum.

4. The device of claim 3 wherein said brake means further includes a pair of brake actuator arms rigidly affixed to said reference speed shaft and radially extended therefrom, and said pressure applicator comprises a spring biased roller connected to each of the extended ends of said pair of actuator arms and seated on said platen supported to advance therealong relative to the shoes for applying a varying pressure to the brake shoes in response to changes in the angular velocity of the error indicator shaft, relative to the angular velocity of the reference speed shaft.

* * * * *